United States Patent Office 2,693,455
Patented Nov. 2, 1954

2,693,455

REACTIVATION OF SILICEOUS CATALYST

Robert L. Smith, Pitman, and Leonard C. Drake, Wenonah, N. J., assignors to Socony-Vacuum Oil Company, Incorporated, a corporation of New York No Drawing. Application April 21, 1952,
Serial No. 283,514

11 Claims. (Cl. 252—414)

This invention relates to a process for reactivating a catalytic composite useful in the conversion of higher boiling hydrocarbons to lower boiling hydrocarbons such as gasoline. More particularly, the present invention is concerned with a method for reactivating siliceous cracking catalysts which have become poisoned during alternate cracking and regeneration operations by the contaminating effects of minute amounts of nickel.

Siliceous cracking catalysts, including naturally occurring activated clays and synthetically prepared composites, have long been recognized as useful in catalytically promoting hydrocarbon conversion reactions. Such siliceous catalysts contain silica and one or more metal oxides. In clays, the metal oxide is generally alumina. Active synthetic cracking catalysts are usually gels or gelatinous precipitates and include silica-alumina, silica-zirconia, silica-beryllia, and silica-magnesias as well as ternary combinations, such as silica-alumina-zirconia, silica-alumina-beryllia, and silica-alumina-magnesia. Ordinarily, this type of catalyst contains silica and at least one material selected from the group of alumina, zirconia, beryllia, and magnesia. Other metal oxides may also be present if desired, generally in small percentage, such as maganese, chromium, titanium, tungsten, molybdenum, and calcium. Synthetic siliceous cracking catalysts may be prepared by various well known methods, such as by co-gellation or co-precipitation of the silica and metal oxide or by milling together the separately precipitated or gelled components. Alternatively, the metal oxide may be combined with a previously formed siliceous gel utilizing impregnation or base-exchange techniques. The present invention, however, is not limited to catalysts prepared by any particular method but is of general application to siliceous cracking catalysts. It will thus be understood that the catalysts undergoing treatment in accordance with the present invention may be any of the siliceous cracking catalysts heretofore customarily employed which are susceptible to poisoning by the presence of nickel contaminant. It will further be understood that the reactivation treatment described herein is performed on catalysts which have been previously utilized in promoting the conversion of hydrocarbons. Both the natural and synthetic cracking catalysts appear to be effected in generally the same manner and to be substantially fully equivalent in undergoing the reactivation treatment of the present invention.

Commercial catalytic cracking is carried out by contacting a hydrocarbon charge in the vapor or liquid state with a catalyst of the foregoing type under conditions of temperature, pressure, and time to achieve substantial conversion of the charge to lower boiling hydrocarbons. This cracking reaction results in deposition of a carbonaceous deposit commonly called "coke" with consequent decline in catalytic activity of the catalyst. Under conditions to obtain efficient operation from a yield standpoint, it is found desirable to terminate the cracking reaction after a relatively short conversion run, for example, of from 5 to 15 minutes on stream and to thereafter restore the activity of the catalyst by burning off the coke in a regeneration stage. The formation of coke represents a net loss since hydrocarbons are consumed in its production. In addition, it is apparent that the greater the coke deposit, the longer the regeneration period would have to be in proportion to the on-stream period in order not to exceed detrimental temperature levels during regeneration.

It has been found that minute amounts of nickel are highly detrimental to the efficiency of the siliceous cracking catalysts above described. Such catalysts, contaminated even with an extremely small amount of nickel, exhibit decreased activity and excessive coke formation during cracking reactions. In fact, commercial experience with such poisoned catalysts shows about 50 per cent more coke make by the catalyst at equilibrium activity than is produced by the catalyst in unpoisoned condition. Furthermore, since the major portion of the catalyst remains in the cracking system over an extended period of time with recirculation, the amount of nickel contaminant gradually builds up to such a point that further contact of the cracking charge with the catalyst becomes an uneconomical operation. It would appear that the nickel contaminant is introduced with the charge stock or it may be eroded from the equipment. Regardless of its manner of introduction, the presence of nickel contaminant in the siliceous cracking catalyst employed is definitely detrimental, leading to the production of an excessive amount of coke.

It is a major object of this invention to overcome the difficulties caused by the poisoning effects of nickel contaminant on the conversion efficiency of siliceous cracking catalysts. A more specific object is the provision of a method for reducing excessive coke formation on siliceous cracking catalysts contaminated with minute amounts of nickel. A further object is to provide a process for reactivation of such contaminated catalysts.

The above and other objects which will be apparent to those skilled in the art are achieved by the process described herein. Broadly, the present invention involves reactivation of a nickel-poisoned siliceous cracking catalyst by treating the same with acetylacetone. Such treatment, under conditions set forth hereinafter, has been discovered to afford a surprisingly low coke-forming catalyst. It has further been discovered that additional improvement in the gasoline/coke ratio is obtained by a subsequent mild steam treatment.

The catalysts reactivated in accordance with the present invention include both synthetic and natural siliceous composites containing a major proportion of silica and a minor proportion of one or more metal oxides as described above. The catalysts treated in accordance with the present process are further characterized by the presence therein of a small amount of nickel contaminant. Generally, a very minute amount of nickel, as low as 0.006 per cent by weight of the catalytic composite, will exert a detrimental poisoning effect on the cracking characteristics of the described siliceous cracking catalysts. Composites containing an amount of nickel in excess of about 0.20% by weight do not readily respond to the reactivating treatment described herein, and it is accordingly not contemplated that siliceous catalysts which may be contaminated with quantities of nickel greater than about 2000 parts per million will be treated in accordance with the present process. As a general rule, the siliceous catalysts undergoing reactivation will contain about 0.01 and about 0.05 per cent by weight of nickel contaminant.

In practice of the invention, a nickel-poisoned siliceous cracking catalyst which has been previously employed in catalytic conversion of high boiling oils to gasoline is subjected to treatment with acetylacetone. The treatment may be carried out either batch-wise, in which case the catalyst is permitted to remain in contact with the acetylacetone under generally static conditions for a predetermined length of time and then removed therefrom, or treatment may be effected by continuously percolating acetylacetone through a bed of the catalyst. The time of treatment and the temperature of treatment are interrelated variables. The proper selection of time and temperature of treatment will depend upon the extent of deactivation of the catalyst undergoing treatment and on the choice of one of these variables. Thus, if it is desired to complete the treatment in a relatively short period of time, the temperature at which treatment is carried out should be relatively high. On the other hand, if a comparatively low treating temperature is employed, a correspondingly longer time of treatment will be required. In view of the foregoing, it is extremely difficult to establish the exact limiting conditions under which acetylacetone treatment will be carried out in any particular instance. In general, however, the time of treatment of the poisoned catalyst with acetylacetone under the conditions of the invention is ordinarily at least about 1 hour and may extend over a considerable period, ordinarily not exceeding 24 hours; the temperature may range from about 60° F. upwards and usually will not be greater than about 400° F. It has been found that a convenient method of deactivating the nickel-poisoned siliceous catalyst is to bring the same into contact with acetylacetone under refluxing conditions, in which case the temperature will be the boiling point of acetylacetone, namely, 284° F.

After the foregoing treatment, the catalyst is drained free of acetylacetone and soluble acetonates and then washed with an organic solvent miscible with acetylacetone to further displace the acetylacetone within the catalyst pores. The washed catalysts are then dried and calcined. As an optional subsequent treatment, the acetylacetone-treated catalysts may be subjected to a mild steam treatment. The exposure of the previously acetylacetone-treated catalyst to steam is, as will appear from the data set forth hereinafter, a desirable step in the present reactivation procedure. Such steam treatment may be carried out at a temperature within the approximate range of 800 to 1500° F. for at least about 2 hours. Usually, steam at a temperature of about 1000 to 1300° F. will be used, with the treating period extending from about 2 to about 48 hours. Temperatures above 1500° F., and generally above 1300° F. for the clay catalysts, may be detrimental and should be avoided. Generally, optimum improvement in those instances wherein subsequent steam treatment has been employed have been obtained by exposure of the acetylacetone-treated catalyst to steam at a temperature within the range of 1100° F. to 1200° F. for a period between about 10 and about 24 hours at atmospheric pressure in a 100 per cent steam atmosphere. As long as critically high temperatures, which cause rapid shrinkage or sintering of the catalysts, are avoided, longer periods of treatment than above designated apparently have no adverse effect. Also, an atmosphere consisting principally of steam, but containing air or other gas substantially inert with respect to the composite being treated, may be used and such mixtures are, in fact, desirable with the use of the more elevated temperatures to avoid possible deactivation of the catalyst.

After the above-described acetylacetone treatment and optional steam treatment, the catalyst is in a reactivated state and may be returned to the conversion chamber of the cracking unit for further use in catalytically promoting the conversion of higher boiling hydrocarbons to hydrocarbons boiling within the range of gasoline.

By utilizing the procedure of the present invention, the detrimental coke-forming tendencies of nickel-poisoned siliceous cracking catalysts have been desirably reduced. The reason for reactivation of nickel-poisoned siliceous cracking catalysts by treatment with acetylacetone as described herein is not known with certainty. It is, however, believed that since acetylacetone is a chelating agent, this material forms chelate compounds with the nickel present in the contaminated catalyst and in such manner the nickel is rendered catalytically inactive in so far as its tendency to produce coke is concerned. It has been established, as will appear from data set forth hereinafter, that nickel is not removed from the catalyst by treatment with acetylacetone. Assuming the above theory to be correct, it may be postulated that the acetylacetone reacts with the nickel contaminant present in the catalyst with the formation of nickel acetylacetonate. Thus, the reaction between acetylacetone and the nickel contaminant present in the catalyst is believed to proceed in accordance with the following equations:

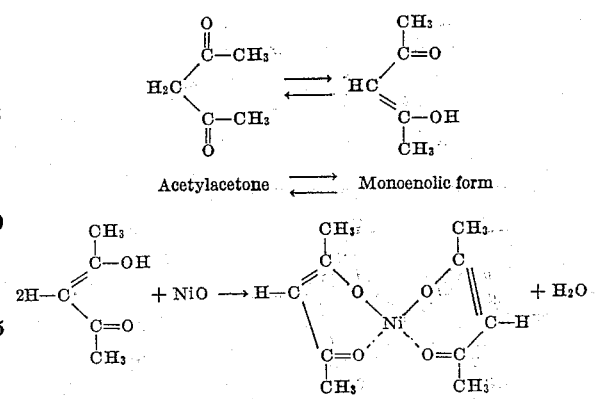

A siliceous cracking catalyst containing approximately 90.85 per cent $SiO_2$, 9% $Al_2O_3$, and 0.15 per cent $Cr_2O_3$ was utilized in a compact moving bed catalytic cracking unit over a period of 141 days for approximately 5 to 6 cycles a day of alternate conversion and regeneration for the cracking of a mixture of California virgin gas oils. The catalyst after such use was found to be poisoned and the poisoning effects were discovered to be due to the presence in the catalyst of a minute amount of nickel to the extent of about 0.01 per cent by weight. Experiments to reactivate the poisoned catalyst were carried out by refluxing 200 grams of the catalyst with 300 milliliters of acetylacetone for the times shown in Table I below. The catalyst was then drained free of acetylacetone and soluble acetylacetonates and then washed with acetone to further displace acetylacetone contained within the catalyst pores. The washed catalyst was then dried and calcined at 1000° F. The catalyst was then tested for catalytic activity in the Cat-A cracking test. The activity data, nickel content, surface areas, and the effect on activity of subsequent steam treatment are set forth in Table I:

*Table I*

| Example | 1 | 2 | 3 | 4 | 5 | 6 |
|---|---|---|---|---|---|---|
| Description | Poisoned Catalyst | After 24 Hrs. Steam 1,100° F. | Acetylacetone Treated | | | |
| | | | 4 Hours | | 16 Hours | |
| | | | Before Steaming | 24 Hrs. Steam 1,100° F. | Before Steaming | 24 Hrs. Steam 1,100° F. |
| Cat-A Activity: | | | | | | |
| Gasoline, Vol. Percent | 29.2 | 30.9 | 29.2 | 28.4 | 27.8 | 27.9 |
| Coke, Wt. Percent | 2.5 | 1.8 | 1.7 | 1.0 | 1.6 | 1.0 |
| Gas, Wt. Percent | 6.7 | 4.6 | 4.7 | 2.6 | 5.3 | 2.7 |
| Nickel, Wt. Percent | 0.01 | | 0.01 | | 0.01 | |
| Surface Area, Sq. M./g | 204 | 205 | 212 | | 209 | |
| Gasoline/Coke | 11.7 | 17.2 | 17.2 | 28.4 | 17.4 | 27.9 |

These data definitely show that although the acetylacetone does not effect removal of nickel from the catalyst, it does reduce the coke make and that subsequent steam treatment further reduces the coke-forming tendencies of the poisoned catalyst much below that obtained by steam treatment alone.

A siliceous synthetic gel cracking catalyst containing about 91 per cent $SiO_2$ and about 9 per cent $Al_2O_3$ and contaminated with approximately 255 p. p. m. of nickel was tested in the standard Cat-A activity test. The product gave a high coke yield.

A sample of the contaminated catalyst (361 grams) was refluxed with 570 millimeters of acetylacetone for four hours. The catalyst was then drained free of acetylacetone, extracted with acetone to remove adhering acetylacetone, air dried and calcined at 1400° F. for 10 hours. The catalyst was subsequently steam treated for 10 hours at 1200° F. The activity data for the untreated and treated catalyst and the effect on activity of subsequent steam treatment are set forth in Table II:

Table II

| Example | 7 | 8 | 9 |
|---|---|---|---|
| Description | Poisoned Catalyst | Acetylacetone Treated | |
| | | Before Steaming | 10 Hrs. Steam 1,200° F. |
| Cat-A Activity: | | | |
| Gasoline, Vol. Percent | 30.1 | 27.5 | 27.5 |
| Coke, Wt. Percent | 3.9 | 3.4 | 2.6 |
| Gas, Wt. Percent | 9.1 | 7.8 | 6.5 |
| Gasoline/Coke | 7.7 | 8.1 | 10.6 |

From the foregoing data, it will be noted that acetylacetone treatment of a nickel-poisoned silica-alumina gel cracking catalyst reduces the coke make and affords an improved gasoline/coke ratio. It will also be noted that subsequent steam treatment of the acetylacetone treated catalyst provides a further reduction in the coke-forming tendencies of the poisoned catalyst.

A siliceous clay cracking catalyst of the acid-activated montmorillonite type contaminated with about 190 p. p. m. of nickel was tested in the standard Cat-A activity test. The product gave a very high coke yield as shown in Table III.

A sample of the contaminated catalyst (345 grams) was refluxed with 570 milliliters of acetylacetone for four hours. The catalyst was then drained free of acetylacetone, extracted with acetone to remove adhering acetylacetone, air dried, and calcined at 1000° F. for 16 hours. The catalyst was subsequently steamed treated for 10 hours at 1200° F. The activity data for the untreated and treated catalyst and the effect on activity of subsequent steam treatment are set forth below:

Table III

| Example | 10 | 11 | 12 |
|---|---|---|---|
| Description | Poisoned Catalyst | Acetylacetone Treated | |
| | | Before Steaming | 10 Hrs. Steam 1,200° F. |
| Cat-A Activity: | | | |
| Gasoline, Vol. Percent | 32.9 | 34.3 | 29.2 |
| Coke, Wt. Percent | 4.3 | 3.4 | 2.0 |
| Gas, Wt. Percent | 8.5 | 5.2 | 3.3 |
| Gasoline/Coke | 7.7 | 10.0 | 14.6 |

These data show that the acetylacetone treatment described herein is effective in reducing the coke make of nickel-poisoned naturally occurring clay catalysts, and that subsequent steam treatment further reduces the coke make of such poisoned catalysts.

It is to be understood that the above description is merely illustrative of preferred embodiments of the invention. While such description has been directed particularly to the reactivation of nickel-poisoned siliceous cracking catalysts, it is contemplated that the method set forth may likewise be applicable for reactivation of various other catalytic composites which may have become poisoned by the presence therein of metal contaminants such as copper, iron, vanadium, and the like.

We claim:

1. A method for reactivating a siliceous cracking catalyst which has become poisoned by a small contaminating amount, less than about 0.20 per cent by weight, of nickel during the conversion of high boiling petroleum hydrocarbons to hydrocarbons boiling in the gasoline range, which comprises subjecting said poisoned catalyst to contact with acetylacetone, removing the catalyst from said contact, and drying and calcining the same.

2. A method for reactivating a siliceous cracking catalyst which has become poisoned by a small contaminating amount, less than about 0.20 per cent by weight, of nickel during the conversion of high boiling petroleum hydrocarbons to hydrocarbons boiling in the gasoline range, which comprises subjecting said poisoned catalyst to contact with acetylacetone, removing the catalyst from said contact, washing the treated catalyst with an organic solvent miscible with acetylacetone, drying, and calcining the washed catalyst.

3. A method for reactivating a siliceous cracking catalyst which has become poisoned by a small contaminating amount, less than about 0.20 per cent by weight, of nickel during the conversion of high boiling petroleum hydrocarbons to hydrocarbons boiling in the gasoline range, which comprises subjecting said poisoned catalyst to contact with acetylacetoane, removing the catalyst from said contact, washing, calcining, and subjecting the resulting catalyst to a mild steam treatment.

4. A method for reactivating a siliceous cracking catalyst which has become poisoned by a small contaminating amount, less than about 0.20 per cent by weight, of nickel during the conversion of high boiling petroleum hydrocarbons to hydrocarbons boiling in the gasoline range, which comprises contacting said poisoned catalyst with acetylacetone for at least about 1 hour, removing the catalyst from contact with said acetylacetone, drying, calcining, and subjecting the resulting catalyst to steam treatment at a temperature in the range of about 800 to about 1500° F. for at least about 2 hours.

5. A method for reactivating a siliceous cracking catalyst which has become poisoned by a small contaminating amount, less than about 0.20 per cent by weight, of nickel during the conversion of high boiling petroleum hydrocarbons to hydrocarbons boiling in the gasoline range, which comprises subjecting said poisoned catalyst to contact with acetylacetone, removing the catalyst from said contact, washing the treated catalyst with an organic solvent miscible wtih acetylacetone, drying, calcining, and treating the resulting catalyst with steam at a temperature in the range of about 1100 to about 1200° F. for a period of between about 10 and about 24 hours.

6. A method for reactivating a siliceous cracking catalyst which has become poisoned by a small contaminating amount, less than about 0.20 per cent by weight, of nickel during the conversion of high boiling petroleum hydrocarbons to hydrocarbons boiling in the gasoline range, which comprises refluxing said poisoned catalyst with acetylacetone, recoving the catalyst from contact with said acetylacetone, washing excess acetylacetone from the catalyst with an organic solvent miscible therewith, drying, and calcining the treated catalyst.

7. A method for reactivating a silica-alumina cracking catalyst contaminated by a minute amount, of less than about 0.20 per cent by weight, of nickel, which comprises subjecting said contaminated catalyst to contact with acetylacetone, removing the catalyst from said contact, drying, and calcining the same.

8. A method for reactivating a synthetic silica-alumina cracking catalyst contaminated by a minute amount, of less than about 0.20 per cent by weight, of nickel, which comprises subjecting said contaminated catalyst to contact with acetylacetone, removing the catalyst from said contact, washing with an organic solvent miscible with acetylacetone, drying, and calcining the resulting catalyst.

9. A method for reactivating a natural silica-alumina catalyst contaminated by a minute amount, of less than about 0.20 per cent by weight, of nickel, which comprises subjecting said contaminated catalyst to contact with acetylacetone, removing the catalyst from said contact, washing wtih an organic solvent miscible with acetylacetone, drying, and calcining the resulting catalyst.

10. A method for reactivating a silica-alumina cracking catalyst contaminated by a minute amount, of less than about 0.20 per cent by weight, of nickel, which comprises subjecting said contaminated catalyst to contact with acetylacetone, removing the catalyst from said contact, drying, calcining and subjecting the resulting catalyst to a mild steam treatment.

11. A method for reactivating a silica-alumina cracking catalyst contaminated by a minute amount, of less than about 0.20 per cent by weight, of nickel, which comprises refluxing said contaminated catalyst with acetylacetone, removing the catalyst from contact with said acetylacetone, washing the resulting catalyst with an organic solvent miscible with acetylacetone, drying, calcining, and subjecting the resulting catalyst to steam treatment at a temperature of between about 1100° F. and about 1200° F. for a period of from 10 to 24 hours.

References Cited in the file of this patent

UNITED STATES PATENTS

| Number | Name | Date |
|---|---|---|
| 1,876,270 | Zorn | Sept. 6, 1932 |
| 1,905,087 | Goebel | Apr. 25, 1933 |
| 2,055,616 | Starr | Sept. 29, 1936 |
| 2,578,144 | McMillan | Dec. 11, 1951 |

OTHER REFERENCES

Synthetic Organic Chemicals, Carbide and Carbons Chemical Co., N. Y., N. Y., 1945, page 57. (Copy in Div. 64.)